United States Patent
Liu et al.

(10) Patent No.: US 10,348,624 B2
(45) Date of Patent: Jul. 9, 2019

(54) VIRTUAL MACHINE DATA FLOW MANAGEMENT METHOD AND SYSTEM

(71) Applicant: TENCENT TECHNOLOGY (SHENZHEN) COMPANY LIMITED, Shenzhen (CN)

(72) Inventors: Hua Liu, Shenzhen (CN); Fuhai Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 79 days.

(21) Appl. No.: 15/605,505

(22) Filed: May 25, 2017

(65) Prior Publication Data
US 2017/0279713 A1    Sep. 28, 2017

Related U.S. Application Data

(63) Continuation of application No. PCT/CN2016/079465, filed on Apr. 15, 2016.

(30) Foreign Application Priority Data

May 19, 2015    (CN) .......................... 2015 1 0256498

(51) Int. Cl.
*H04L 12/721*    (2013.01)
*G06F 9/455*    (2018.01)
(Continued)

(52) U.S. Cl.
CPC .......... *H04L 45/66* (2013.01); *G06F 9/45504* (2013.01); *G06F 9/45558* (2013.01);
(Continued)

(58) Field of Classification Search
CPC . G06F 9/45504; G06F 9/45558; H04L 45/66; H04L 49/358; H04L 49/70; H04L 67/104
See application file for complete search history.

(56) References Cited

U.S. PATENT DOCUMENTS 8,478,853 B2    7/2013 Droux et al.
2012/0250686 A1*    10/2012 Vincent ............... H04L 12/4633
370/392

FOREIGN PATENT DOCUMENTS

CN    102946366 A    2/2013
CN    104144130 A    11/2014

OTHER PUBLICATIONS

The World Intellectual Property Organization (WIPO) International Search Report for PCT/CN2016/079465 dated Jul. 7, 2016 pp. 1-5.

* cited by examiner

*Primary Examiner* — Jamal Javaid
(74) *Attorney, Agent, or Firm* — Anova Law Group, PLLC

(57) ABSTRACT

The present disclosure provides a virtual machine data flow management method. The method includes: receiving, by a host by using a specified network interface of an SR-IOV network adapter, an IP packet sent by a communication peer terminal, a target MAC address and a target IP address in the IP packet respectively being a MAC address of a specified network interface of the host and an IP address of a target virtual sub-machine; and forwarding, by the host according to the target IP address, the IP packet to a virtual connection function of the target virtual sub-machine in the same SR-IOV network adapter. Also disclosed is a virtual machine data flow management system. By means of the present disclosure, network communication performance of a virtual machine can be improved.

10 Claims, 5 Drawing Sheets

A host receives, by using a specified network interface of an SR-IOV network adapter, an IP packet sent by a communication peer terminal, a target MAC address and a target IP address in the IP packet respectively being a MAC address of a specified network interface of the host and an IP address of a target virtual sub-machine — S101

The host forwards, according to the target IP address, the IP packet to a virtual connection function of the target virtual sub-machine in the same SR-IOV network adapter — S102

(51) Int. Cl.
*H04L 29/12* (2006.01)
*H04L 29/08* (2006.01)
*H04L 29/06* (2006.01)

(52) U.S. Cl.
CPC ........ *H04L 61/103* (2013.01); *H04L 61/2007* (2013.01); *H04L 67/104* (2013.01); *H04L 67/38* (2013.01); *G06F 2009/45579* (2013.01); *G06F 2009/45595* (2013.01); *H04L 61/6022* (2013.01)

VIRTUAL MACHINE DATA FLOW MANAGEMENT METHOD AND SYSTEM

RELATED APPLICATION

This application claims priority to PCT Application No. PCT/CN2016/079465, filed on Apr. 15, 2016, which claims priority of Chinese Patent Application No. 201510256498.2, entitled "VIRTUAL MACHINE DATA FLOW MANAGEMENT METHOD AND SYSTEM" filed on May 19, 2015, which are both incorporated by reference in their entirety.

FIELD OF THE TECHNOLOGY

The present disclosure relates to the field of computer technologies, and in particular, to a virtual machine data flow management method and system.

BACKGROUND OF THE DISCLOSURE

By means of a server virtualization technology, hardware such as a CPU, a memory, a disk, and an input/output (I/O) port, becomes a "resource pool" that can be managed dynamically, thereby improving resource usage and making a computer system more adaptable to a service change. Currently, in the virtualization technology, a para-virtualization (PV) solution using a PV driver may be used in network communication between a virtual sub-machine and a host. That is, a back-end driver is installed on a side of the host, while a front-end driver is installed on a virtual sub-machine side, so that the network communication of the virtual sub-machine is implemented by interaction between the front-end driver and the back-end driver. All packets that are sent to the virtual sub-machine or sent by the virtual sub-machine pass through the back-end driver on the host-side, so that management such as packet filtering and quality of service (QoS) on the network communication of the virtual sub-machine may be performed on the host-side. However, because packets of all virtual sub-machines are processed by using the back-end driver on the host-side, that is, the back-end driver on the host-side performs soft routing, which may cause a very heavy processing burden of a CPU on the host-side. For example, when a gigabit network adapter is used, a network throughput and consumption of the CPU are acceptable. When a 10-GB network adapter is used, a performance bottleneck of the CPU on the host-side is easily generated and the service life of the CPU may be negatively affected. Thus, the processing capability of the network adapter cannot be fully realized.

SUMMARY

A technical problem to be resolved by embodiments of the present disclosure is to provide a virtual machine data flow management method and system, so as to improve network communication performance of a virtual machine.

To resolve the foregoing technical problem, an embodiment of the present disclosure provides a virtual machine data flow management method, and the method includes: receiving, by a host by using a specified network interface of an SR-IOV network adapter, an IP packet sent by a communication peer terminal, a target MAC address and a target IP address in the IP packet respectively being a MAC address of a specified network interface of the host and an IP address of a target virtual sub-machine; and forwarding, by the host according to the target IP address, the IP packet to a virtual connection function of the target virtual sub-machine in the same SR-IOV network adapter.

Correspondingly, an embodiment of the present disclosure also provides a virtual machine data flow management method, and the method includes: sending, by a target virtual sub-machine, an IP packet by using a virtual connection function of an SR-IOV network adapter, a target MAC address and a target IP address in the IP packet respectively being a MAC address of a specified network interface of a host corresponding to the target virtual sub-machine in the same SR-IOV network adapter and an IP address of a communication peer terminal; and forwarding, by the host, the IP packet to the communication peer terminal according to the target IP address after receiving the IP packet by using the specified network interface in the SR-IOV network adapter.

Corresponding, an embodiment of the present disclosure also provides a virtual machine data flow management system, including a host and at least one virtual sub-machine, the host being configured to receive, by using a specified network interface of an SR-IOV network adapter, an IP packet sent by a communication peer terminal, a target MAC address and a target IP address in the IP packet respectively being a MAC address of a specified network interface of the host and an IP address of the target virtual sub-machine; and the host being further configured to forward, according to the target IP address, the IP packet to a virtual connection function of the target virtual sub-machine in the same SR-IOV network adapter.

Corresponding, an embodiment of the present disclosure also provides a virtual machine data flow management system, including a host and at least one virtual sub-machine, the target virtual sub-machine being configured to send an IP packet by using a virtual connection function of an SR-IOV network adapter, a target MAC address and a target IP address in the IP packet respectively being a MAC address of a specified network interface of the host corresponding to the target virtual sub-machine in the same SR-IOV network adapter and an IP address of a communication peer terminal; and the host being configured to: after the IP packet is received by using the specified network interface in the SR-IOV network adapter, forward the IP packet to the communication peer terminal according to the target IP address.

In the embodiments of the present disclosure, by configuring a MAC address of a specified network interface of a host corresponding to a virtual sub-machine in an IP packet passing through the virtual sub-machine, network data of a target virtual sub-machine may pass through the specified network interface of the host, so that packet filtering and QoS management on the network data of the target virtual sub-machine may be implemented. In addition, because data is not processed by using a back-end driver on a side of the host, generation of a performance bottleneck of a CPU on the host-side or an impact on a service life of the CPU are avoided, thereby fully implementing using a processing capability of a network adapter.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
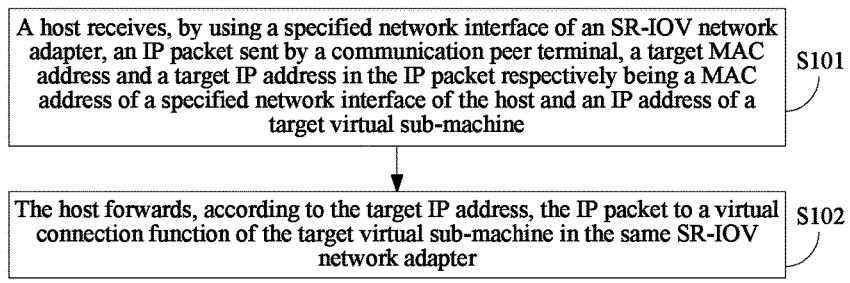
FIG. 1 is a schematic flowchart of a virtual machine data flow management method according to an embodiment of the present disclosure.

FIG. 1 is a schematic flowchart of a virtual machine data flow management method according to an embodiment of the present disclosure. As shown in FIG. 1, a procedure of the virtual machine data flow management method in this embodiment may include:

S101: A host receives, by using a specified network interface of an SR-IOV network adapter, an IP packet sent by a communication peer terminal, a target MAC address and a target IP address in the IP packet respectively being a MAC address of a specified network interface of the host and an IP address of a target virtual sub-machine.

The specified network interface of the host is a physical connection function (hereinafter referred to as PF, Physical Function) to which a virtual connection function (hereinafter referred to as VF, Virtual Function) of the target virtual sub-machine in this embodiment belongs, or is another virtual connection function VF belonging to a same physical connection function PF to which the virtual connection function VF of the target virtual sub-machine belongs. In this embodiment of the present disclosure, when the communication peer terminal sends an IP packet to a virtual sub-machine belonging to the same SR-IOV network adapter, a target MAC address in the IP packet is the MAC address of the specified network interface of the host corresponding to the virtual sub-machine, so that a side of the host may receive, by using a specified network interface of the SR-IOV network adapter, the IP packet sent by the communication peer terminal. The communication peer terminal is an external network device, that is, another network device besides the host.

S102: The host forwards, according to the target IP address, the IP packet to a virtual connection function of the target virtual sub-machine in the same SR-IOV network adapter.

Figure 3:
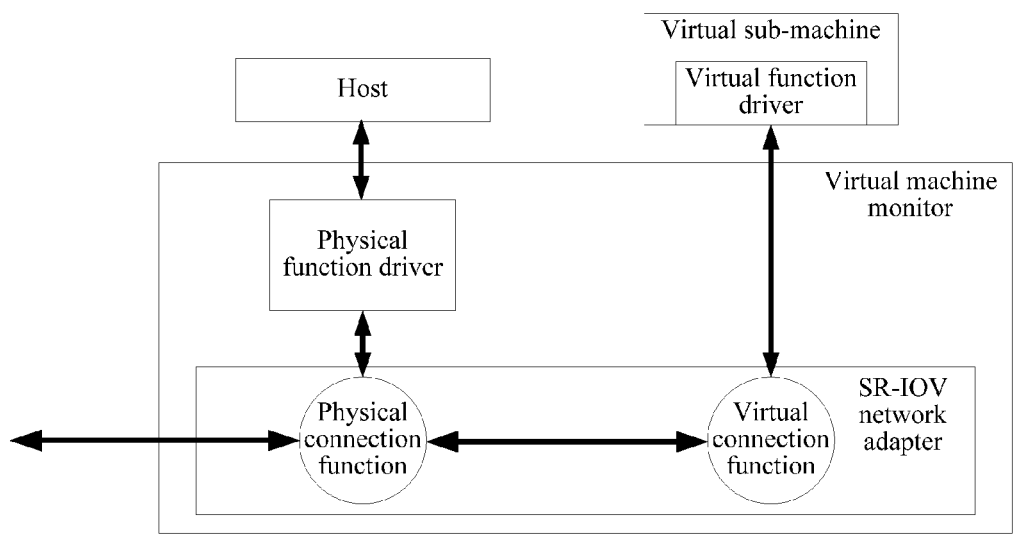
FIG. 3 is a schematic diagram of a communication architecture of a network adapter of an SR-IOV technology according to an embodiment of the present disclosure.

In a specific implementation, the virtual machine data flow management method in this embodiment of the present disclosure is based on L2 (Layer 2, that is, a data link layer) exchange logic in a network adapter supporting a single-root I/O virtualization (SR-IOV) technology. A communication architecture of the network adapter of the SR-IOV technology may be shown in FIG. 3. Before the procedure in this embodiment is performed, a virtual connection function (hereinafter referred to as VF, Virtual Function) may be generated and allocated for the target virtual sub-machine by using a physical connection function (hereinafter referred to as PF, Physical Function) of a network adapter of the host in FIG. 3, an IP address and a virtual MAC address of the VF are allocated at the same time, and the VF obtained after the allocation is directly connected to the target virtual sub-machine. The host in this embodiment of the present disclosure may manage mapping relationships between VFs of virtual sub-machines and IP addresses of the VFs. When receiving an IP packet sent from outside, the host may forward, according to a target IP address included in the IP packet, the IP packet to a virtual connection function of a corresponding target virtual sub-machine in a same SR-IOV network adapter, so that the target virtual sub-machine receives the IP packet.

Therefore, after the host receives, by using the specified network interface, IP data sent by the communication peer terminal, packet filtering and QoS management may be performed on the IP data, and then network data obtained after the packet filtering and QoS management is forwarded to the VF of the target virtual sub-machine, thereby implementing that on the host-side, packet filtering and QoS management may be performed on network data sent to the target virtual sub-machine.

Further, in an optional embodiment, when the communication peer terminal sends the IP packet to the target virtual sub-machine, to set the target MAC address to the MAC address of the specified network interface of the host corresponding to the virtual sub-machine. In this embodiment of the present disclosure, this objective may be implemented by performing the following procedures 110) and 120):

110) Obtain an ARP request message that is sent by the communication peer terminal for the target virtual sub-machine, where a target IP address in the ARP request message is the IP address of the target virtual sub-machine.

Specifically, when it is detected that a target IP address (such as arp_tpa in the ARP request message, a target protocol address) in an ARP request message received by a physical network adapter from outside is the IP address of the target virtual sub-machine, it is determined that the ARP request message sent by the communication peer terminal for the target virtual sub-machine is obtained, perform 120).

Steps 110) and 120) may be performed by a virtual machine communication configuration module in this embodiment of the present disclosure, and the virtual machine communication configuration module may be implemented in the target virtual sub-machine, or may be implemented in the host. If the virtual machine communication configuration module is implemented in the target virtual sub-machine, when the target virtual sub-machine receives the ARP request message that is for the target virtual sub-machine, the virtual machine communication configuration module receives the ARP request message that is for the target virtual sub-machine. If the virtual machine communication configuration module is implemented in the host corresponding to the target virtual sub-machine, because the ARP request message is broadcast, the host-side also receives the ARP request message actually. However, generally, the host-side discards the ARP request message because the target IP address in the ARP request message is not an IP address of the host-side. The virtual machine communication configuration module on the host-side may detect whether the target IP address in the ARP request message received by the physical network adapter from outside is the IP address of the target virtual sub-machine, and if yes, it is determined that the ARP request message sent by the communication peer terminal for the target virtual sub-machine is obtained.

120) Send an ARP response message to the communication peer terminal according to the ARP request message, where a MAC address of a sender or an Ethernet source address in the ARP response message is the MAC address of the specified network interface of the host, so that the communication peer terminal sends, according to the ARP response message, the IP packet to the specified network interface of the host corresponding to the target virtual sub-machine.

Specifically, in the existing technology, when receiving the ARP request message, the target virtual sub-machine sends a corresponding ARP response message to the communication peer terminal. In the ARP response message, an IP address (such as arp_spa in the ARP response message, a sender protocol address) of a sender is an IP address of a VF pre-allocated to the target virtual sub-machine, and the MAC address (such as a arp_sha field in the ARP response message, a sender hardware address) of the sender or an Ethernet source address (such as a ether_shost field in the ARP response message) is a virtual MAC address of the VF pre-allocated to the target virtual sub-machine. In this way, the communication peer terminal sends the IP packet to the target virtual sub-machine according to the IP address of the sender and the MAC address of the sender (or the Ethernet source address) in the ARP response message. Because the VF in this architecture is directly connected to the target virtual sub-machine, a problem that on the host-side, management such as packet filtering and quality of service (QoS) cannot be performed on the IP packet sent to the virtual sub-machine may be generated.

Therefore, in this embodiment of the present disclosure, the virtual machine communication configuration module sends an ARP response message to the communication peer terminal, where a MAC address of a sender or an Ethernet source address in the ARP response message is the MAC address of the specified network interface of the host corresponding to the target virtual sub-machine, that is, a MAC address corresponding to a VF of the target virtual sub-machine in the ARP response message that should be used to respond is replaced with the MAC address of the specified network interface of the host, so that after receiving the ARP response message, the communication peer terminal may send, according to the ARP response message, the IP packet to the specified network interface of the host corresponding to the target virtual sub-machine. Subsequently, after the host corresponding to the target virtual sub-machine receives, by using the specified network interface, IP data sent by the communication peer terminal, packet filtering and QoS management are performed on the IP data, and then network data obtained after the packet filtering and QoS management is forwarded to the VF of the target virtual sub-machine, thereby implementing that on the host-side, packet filtering and QoS management may be performed on network data sent to the target virtual sub-machine.

It should be noted that, using an APR response manner to enable the communication peer terminal to send the IP packet of the target virtual sub-machine to the specified network interface of the corresponding host is merely an optional embodiment of the present disclosure. In another optional embodiment, another manner may also be used, for example, on a side of the communication peer terminal, by manually configuring the target MAC address of the IP packet to the specified network interface of the host, or by broadcasting, in a network, a mapping relationship between an IP address of a virtual sub-machine and a MAC address of a specified network interface of a host corresponding to the virtual sub-machine, the communication peer terminal knows the MAC address of the specified network interface of the host corresponding to the target virtual sub-machine, so as to implement this objective.

Further, in this embodiment of the present disclosure, because transferring, by the specified network interface of the host, the IP packet of the virtual sub-machine is implemented by configuring the MAC address without any processing performed by a back-end driver on the host-side, so that generation of a performance bottleneck of a CPU on the host-side or an impact on a service life of the CPU are avoided, thereby fully implementing using a processing capability of a network adapter.

Figure 2:
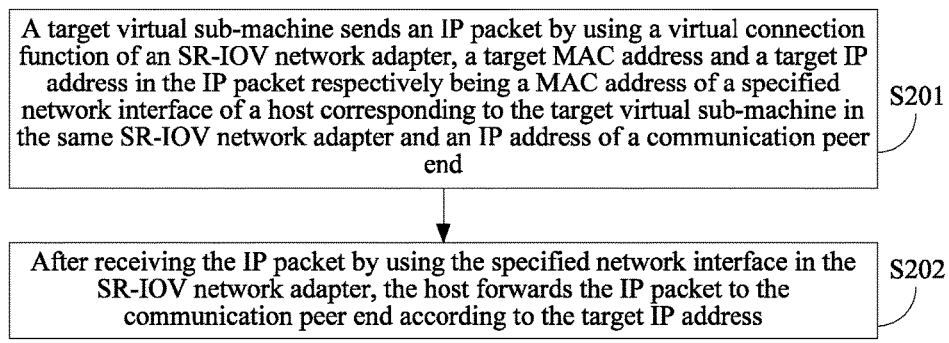
FIG. 2 is a schematic flowchart of a virtual machine data flow management method according to another embodiment of the present disclosure.

FIG. 2 is a schematic flowchart of a virtual machine data flow management method according to another embodiment of the present disclosure. As shown in FIG. 2, a procedure of the virtual machine data flow management method in this embodiment may include:

S201: A target virtual sub-machine sends an IP packet by using a virtual connection function of an SR-IOV network adapter, a target MAC address and a target IP address in the IP packet respectively being a MAC address of a specified network interface of a host corresponding to the target virtual sub-machine in the same SR-IOV network adapter and an IP address of a communication peer terminal.

Specifically, in this embodiment, the target virtual sub-machine is similar to that in the foregoing embodiment, an IP address and a virtual MAC address of a VF are pre-allocated to the target virtual sub-machine, the VF obtained after the pre-allocation is directly connected to the target virtual sub-machine, and the target virtual sub-machine sends network data by using the VF. The specified network interface of the host is a PF to which the VF of the target virtual sub-machine in this embodiment belongs or is another VF belonging to a same PF to which the VF of the target virtual sub-machine belongs. When the target virtual sub-machine sends the IP packet, the target IP address of the IP packet is an IP address of a target communication peer terminal, and the target MAC address is the MAC address of the specified network interface of the host corresponding to the target virtual sub-machine in the same SR-IOV network adapter, so that a side of the host may receive, by using a specified network interface of the SR-IOV network adapter, the IP packet sent by the target virtual sub-machine.

S202: After receiving the IP packet by using the specified network interface in the SR-IOV network adapter, the host forwards the IP packet to the communication peer terminal according to the target IP address.

Therefore, after the host receives, by using the specified network interface, IP data sent by the target virtual sub-machine by using the VF, packet filtering and QoS management may be performed on the IP data, and then network data obtained after the packet filtering and QoS management is forwarded to the communication peer terminal, thereby implementing that on the host-side, packet filtering and QoS management may be performed on network data sent by the target virtual sub-machine.

Further, in an optional embodiment, when the target virtual sub-machine sends the IP packet, to set the target MAC address to the MAC address of the specified network interface of the host corresponding to the virtual sub-machine. In this embodiment of the present disclosure, this objective may be implemented by performing the following steps 210) and 220):

210) Detect that the target virtual sub-machine sends an ARP request message.

Specifically, in this embodiment, the target virtual sub-machine is similar to that in the foregoing embodiment, an IP address and a virtual MAC address of a VF are pre-allocated to the target virtual sub-machine, the VF obtained after the pre-allocation is directly connected to the target virtual sub-machine, and the target virtual sub-machine sends network data by using the VF. When the target virtual sub-machine sends the ARP request message, an IP address (such as arp_spa in the ARP request message, a sender protocol address) of a sender and a MAC address (such as arp_sha in the ARP request message, a sender hardware address) of the sender of the ARP request message is the IP address and the virtual MAC address of the VF pre-allocated to the target virtual sub-machine, and a target IP address (such as arp_tpa in the ARP request message, a target protocol address) is the IP address of the target communication peer terminal. It may be determined, according to the IP address of the sender and/or the MAC address of the sender in the ARP request message, that the ARP request message is sent by the target virtual sub-machine.

Steps 210) and 220) may be performed by a virtual machine communication configuration module in this embodiment of the present disclosure, and the virtual machine communication configuration module may be implemented in the target virtual sub-machine, or may be implemented in the host. If the virtual machine communication configuration module is implemented in the target virtual sub-machine, when the target virtual sub-machine needs to send the ARP request message, the virtual machine communication configuration module may know that: if the virtual machine communication configuration module is implemented in the host corresponding to the target virtual sub-machine, because the ARP request message is broadcast, actually, the host-side receives the ARP request message first. However, generally, the host-side discards the ARP request message because the target IP address in the ARP request message is not an IP address of the host-side. The virtual machine communication configuration module on the host-side may detect whether the IP address of the sender and/or the MAC address of the sender in the received ARP request message is the IP address and/or the MAC address of the target virtual sub-machine, and if yes, it is determined that the ARP request message sent by the target virtual sub-machine is obtained.

220) Send an ARP response message to the target virtual sub-machine according to the ARP request message, where a MAC address of a sender or an Ethernet source address in the ARP response message is the MAC address of the specified network interface of the host, so that the target virtual sub-machine sends, according to the ARP response message, the IP packet to the specified network interface of the host corresponding to the target virtual sub-machine.

Specifically, in the existing technology, after sending the ARP request message, the target virtual sub-machine receives an ARP response message, where a MAC address of a sender or an Ethernet source address included in the ARP response message is the MAC address of the communication peer terminal. Then IP data is sent to the communication peer terminal according to the MAC address of the communication peer terminal. Because a VF in a communication architecture of a network adapter of an SR-IOV technology is directly connected to a Vport of a physical network adapter, that is, the IP data sent by the target virtual sub-machine by using the VF may be sent directly by using the Vport. Therefore, a problem that on the host-side, management such as packet filtering and quality of service (QoS) cannot be performed on the IP packet sent by the virtual sub-machine may be generated.

Therefore, in this embodiment of the present disclosure, the virtual machine communication configuration module sends an ARP response message to the target virtual sub-machine, where a MAC address of a sender or an Ethernet source address in the ARP response message is the MAC address of the specified network interface of the host corresponding to the target virtual sub-machine, that is, an ARP response message is forged, where an actual MAC address of the communication peer terminal corresponding to a target IP address in the ARP response message originally sent by the target virtual sub-machine is replaced with the MAC address of the specified network interface of the host, so that after receiving the ARP response message, the target virtual sub-machine may send, according to the ARP response message, the IP packet to the specified network interface of the host corresponding to the target virtual sub-machine. Therefore, after the host corresponding to the target virtual sub-machine receives, by using the specified network interface, IP data subsequently sent by the target virtual sub-machine, packet filtering and QoS management are performed on the IP data, and then network data obtained after the packet filtering and the QoS management is sent to the communication peer terminal, thereby implementing that on the host-side, packet filtering and QoS management may be performed on network data sent by the target virtual sub-machine.

It should be noted that using an APR response manner to enable the target virtual sub-machine to send the IP packet to the specified network interface of the corresponding host is merely an optional embodiment of the present disclosure. In another optional embodiment, another manner may also be used, for example, the target virtual sub-machine configures, in driver configuration, the target MAC address of the IP packet to the specified network interface of the corresponding host, so as to implement this objective.

Therefore, in this embodiment of the present disclosure, because transferring, by the specified network interface of the host, the IP packet of the virtual sub-machine is implemented by configuring the MAC address without any processing performed by a back-end driver on the host-side, so that generation of a performance bottleneck of a CPU on the host-side or an impact on a service life of the CPU are avoided, thereby fully implementing using a processing capability of a network adapter.

Figure 4:
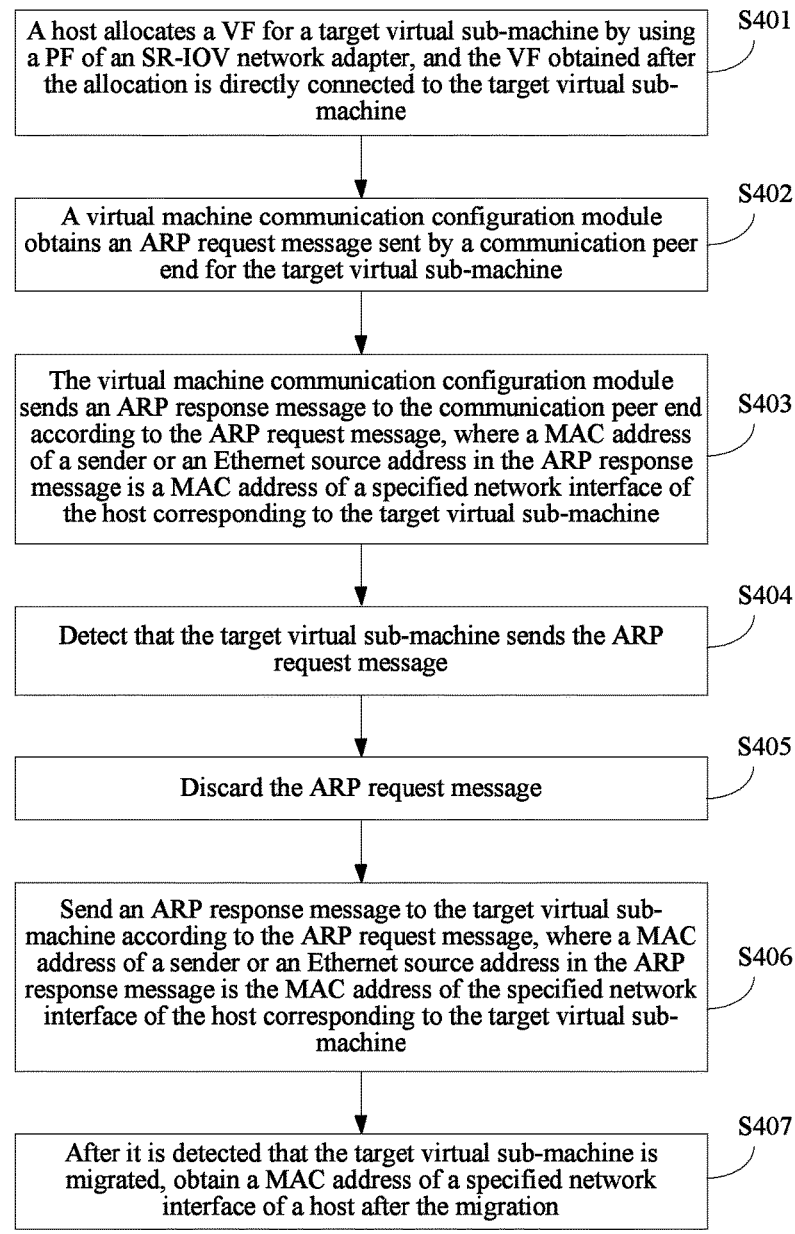
FIG. 4 is a schematic flowchart of a virtual machine data flow management method according to another embodiment of the present disclosure.

FIG. 4 is a schematic flowchart of a virtual machine data flow management method according to another embodiment of the present disclosure. This embodiment emphatically introduces that how a virtual machine communication configuration module configures a MAC address to implement transferring, by a specified network interface of a host, network data passing through a target virtual sub-machine. In this embodiment, the virtual machine communication configuration module is implemented inside of the target virtual sub-machine. As shown in FIG. 4, a procedure of the virtual machine data flow management method in this embodiment includes the following steps.

S401: A host allocates a virtual connection function VF for a target virtual sub-machine by using a physical connection function PF of an SR-IOV network adapter, and allocates an IP address and a virtual MAC address of the VF at the same time. The VF obtained after the allocation is directly connected to the target virtual sub-machine.

S402: A virtual machine communication configuration module obtains an ARP request message sent by a communication peer terminal for the target virtual sub-machine.

In this embodiment, the virtual machine communication configuration module is implemented inside of the target virtual sub-machine. When the target virtual sub-machine receives the ARP request message for the target virtual sub-machine, the virtual machine communication configuration module receives the ARP request message for the target virtual sub-machine.

S403: The virtual machine communication configuration module sends an ARP response message to the communication peer terminal according to the ARP request message, where a MAC address of a sender or an Ethernet source address in the ARP response message is a MAC address of a specified network interface of the host corresponding to the target virtual sub-machine.

That is, a MAC address corresponding to the VF of the target virtual sub-machine in the ARP response message that should be used to respond is replaced with the MAC address of the specified network interface of the host, so that after receiving the ARP response message, the communication peer terminal may send, according to the ARP response message, an IP packet to the specified network interface of the host corresponding to the target virtual sub-machine. Subsequently, after the host corresponding to the target virtual sub-machine receives, by using the specified network interface, IP data sent by the communication peer terminal, packet filtering and QoS management may be performed on the IP data, and then network data obtained after the packet filtering and the QoS management is forwarded to the VF of the target virtual sub-machine, thereby implementing that on the host-side, packet filtering and QoS management may be performed on network data sent to the target virtual sub-machine.

The specified network interface of the host corresponding to the target virtual sub-machine is a physical connection function PF to which a virtual connection function VF of the target virtual sub-machine belongs, or is another virtual connection function VF belonging to a same physical connection function PF to which the virtual connection function VF of the target virtual sub-machine belongs.

S404: Detect that the target virtual sub-machine sends the ARP request message.

In this embodiment, the virtual machine communication configuration module is implemented inside of the target virtual sub-machine. It may be detected that the VF of the target virtual sub-machine sends the ARP request message according to an instruction of an operating system.

S405: Discard the ARP request message.

That is, the virtual machine communication configuration module intercepts and prevents the target virtual sub-machine from sending the ARP request message.

S406: Send an ARP response message to the target virtual sub-machine according to the ARP request message, where a MAC address of a sender or an Ethernet source address in the ARP response message is the MAC address of the specified network interface of the host corresponding to the target virtual sub-machine.

That is, the virtual machine communication configuration module forges an ARP response message, where an actual MAC address of the communication peer terminal corresponding to a target IP address in the ARP response message sent by the target virtual sub-machine is replaced with the MAC address of the specified network interface of the host, so that after receiving the ARP response message, the target virtual sub-machine may send, according to the ARP response message, the IP packet to the specified network interface of the host corresponding to the target virtual sub-machine. In addition, after the host corresponding to the target virtual sub-machine receives, by using the specified network interface, IP data subsequently sent by the target virtual sub-machine, packet filtering and QoS management are performed on the IP data, and then network data obtained after the packet filtering and the QoS management is sent to the communication peer terminal, thereby implementing that on the host-side, packet filtering and QoS management may be performed on network data sent by the target virtual sub-machine. The specified network interface of the host corresponding to the target virtual sub-machine is a physical connection function PF to which a virtual connection function VF of the target virtual sub-machine belongs, or is another virtual connection function VF belonging to a same physical connection function PF to which the virtual connection function VF of the target virtual sub-machine belongs.

S407: After it is detected that the target virtual sub-machine is migrated, obtain a MAC address of a specified network interface of the host after the migration.

In a specific implementation, in a process of hot migration of the target virtual sub-machine in a communication architecture of a network adapter of an SR-IOV technology, a network adapter corresponding to the VF used by the virtual sub-machine needs to be hot swapped. After the virtual sub-machine is migrated, by using a communication mechanism between VFs, and a VF and a PF to which the VF belongs in the communication architecture of the network adapter of the SR-IOV technology, the virtual machine communication configuration module may obtain a MAC address of a specified network interface of a corresponding host after the hot migration of the target virtual sub-machine, so that when S401 to S403 and S404 to S406 are performed subsequently, packet filtering and QoS management may be performed on network data sent to the target virtual sub-machine or network data sent by the target virtual sub-machine may be performed.

Figure 5:
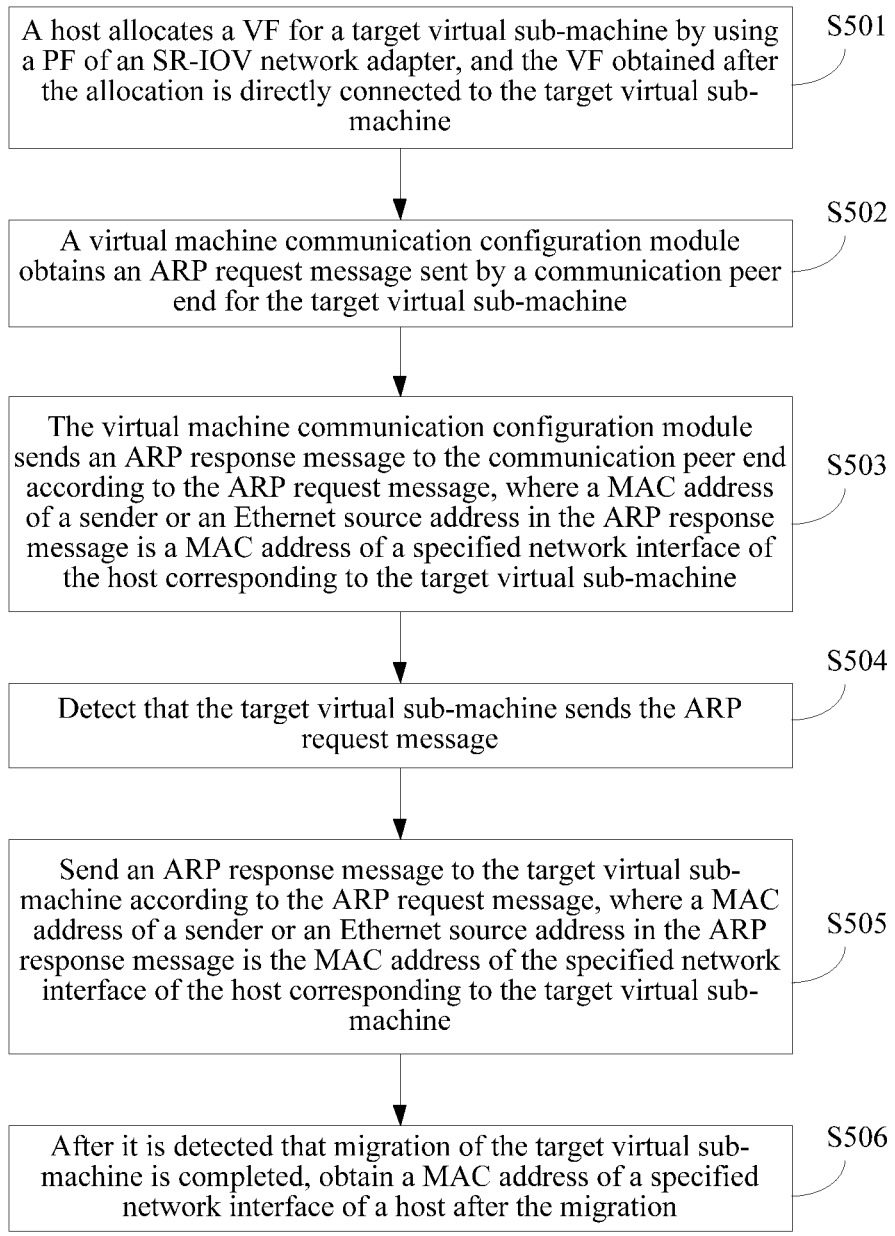
FIG. 5 is a schematic flowchart of a virtual machine data flow management method according to another embodiment of the present disclosure.

FIG. 5 is a schematic flowchart of a virtual machine data flow management method according to another embodiment of the present disclosure. This embodiment emphatically introduces that how a virtual machine communication configuration module configures a MAC address to implement transferring, by a specified network interface of a host, network data passing through a target virtual sub-machine. In this embodiment, the virtual machine communication configuration module is implemented on a side of the host corresponding to the target virtual sub-machine. As shown in FIG. 5, a procedure of the virtual machine data flow management method in this embodiment includes:

S501: A host allocates a virtual connection function VF for a target virtual sub-machine by using a physical connection function PF of an SR-IOV network adapter, and allocates an IP address and a virtual MAC address of the VF at the same time. The VF obtained after the allocation is directly connected to the target virtual sub-machine.

S502: A virtual machine communication configuration module obtains an ARP request message sent by a communication peer terminal for the target virtual sub-machine.

In this embodiment, the virtual machine communication configuration module is implemented in the host corresponding to the target virtual sub-machine, because the ARP request message is broadcast, the host-side also receives the ARP request message actually. However, generally, the host-side discards the ARP request message because a target IP address in the ARP request message is not an IP address of the host-side. In this embodiment of the present disclosure, the virtual machine communication configuration module on the host-side may detect whether the target IP address in the ARP request message received by a physical network adapter from outside is the IP address of the target virtual sub-machine, and if yes, it is determined that the ARP request message sent by the communication peer terminal for the target virtual sub-machine is obtained.

S503: The virtual machine communication configuration module sends an ARP response message to the communication peer terminal according to the ARP request message, where a MAC address of a sender or an Ethernet source address in the ARP response message is a MAC address of a specified network interface.

In this embodiment, it is stipulated that the target virtual sub-machine does not respond the ARP request message sent from outside. The virtual machine communication configuration module sends an ARP response message to the external communication peer terminal, and the MAC address corresponding to the VF of the target virtual sub-machine in the ARP response message that should be used to respond is replaced with the MAC address of the specified network interface of the host, so that after receiving the ARP response message, the communication peer terminal may send, according to the ARP response message, an IP packet to the specified network interface of the host corresponding to the target virtual sub-machine. In an optional embodiment, after the host corresponding to the target virtual sub-machine receives, by using a specified network interface of the host corresponding to the target virtual sub-machine, IP data sent by the communication peer terminal, packet filtering and QoS management are performed on the IP data, and then network data obtained after the packet filtering and the QoS management is forwarded to the VF of the target virtual sub-machine, thereby implementing that on the host-side, packet filtering and QoS management may be performed on network data sent to the target virtual sub-machine. The specified network interface of the host corresponding to the target virtual sub-machine is a physical connection function PF to which the virtual connection function VF of the target virtual sub-machine belongs, or is another virtual connection function VF belonging to a same physical connection function PF to which the virtual connection function VF of the target virtual sub-machine belongs.

S504: Determine that an IP address of a sender in the ARP request message is an IP address of the target virtual sub-machine.

In this embodiment, the virtual machine communication configuration module is implemented in the host-side corresponding to the target virtual sub-machine, because the ARP request message is broadcast, actually, the host-side also receives the ARP request message first. However, generally, the host-side discards the ARP request message because a target IP address in the ARP request message is not an IP address of the host-side. In this embodiment of the present disclosure, the virtual machine communication configuration module on the host-side may detect whether the IP address of the sender or the MAC address of the sender in the received ARP request message, and if yes, it is determined that the ARP request message sent by the target virtual sub-machine is obtained.

S505: Send an ARP response message to the target virtual sub-machine according to the ARP request message, where a MAC address of a sender or an Ethernet source address in the ARP response message is the MAC address of the specified network interface of the host, so that the target virtual sub-machine sends, according to the ARP response message, the IP packet to the specified network interface of the host corresponding to the target virtual sub-machine.

That is, the virtual machine communication configuration module intercepts and prevents the target virtual sub-machine from sending the ARP request message, and forges an ARP response message, where for the MAC address of the sender or the Ethernet source address in the ARP response message, an actual MAC address of the communication peer terminal corresponding to the target IP address in the ARP request message sent by the target virtual sub-machine is replaced with the MAC address of the specified network interface of the host, so that after receiving the ARP response message, the target virtual sub-machine may send, according to the ARP response message, the IP packet to the specified network interface of the host corresponding to the target virtual sub-machine. In addition, in an optional embodiment, after the host corresponding to the target virtual sub-machine receives, by using the specified network interface, IP data subsequently sent by the target virtual sub-machine, packet filtering and QoS management are performed on the IP data, and then network data obtained after the packet filtering and the QoS management is sent to the communication peer terminal, thereby implementing that on the host-side, packet filtering and QoS management may be performed on network data sent by the target virtual sub-machine.

S506: After it is detected that migration of the target virtual sub-machine is completed, obtain a MAC address of a virtual function network interface of the target virtual sub-machine after the migration.

In a specific implementation, in a process of hot migration of the target virtual sub-machine in a communication architecture of a network adapter of an SR-IOV technology, a network adapter corresponding to the VF used by the virtual sub-machine needs to be hot swapped. After the virtual sub-machine is migrated, by using a communication mechanism between VFs, and a VF and a PF to which the VF belongs in communication architecture of the network adapter of the SR-IOV technology, the virtual machine communication configuration module may obtain a MAC address of a VF obtained after allocation after the hot migration of the target virtual sub-machine, so that when S501 to S503, S504, and S505 are performed subsequently, packet filtering and QoS management may be performed on network data sent to the target virtual sub-machine or network data sent by the target virtual sub-machine may be performed.

Figure 6:
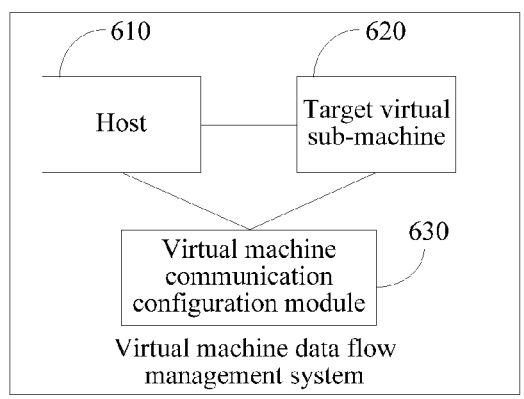
FIG. 6 is a schematic structural diagram of a virtual machine data flow management system according to an embodiment of the present disclosure.

FIG. 6 is a schematic structural diagram of a virtual machine data flow management system according to an embodiment of the present disclosure. As shown in FIG. 6, the virtual machine data flow management system in this embodiment of the present disclosure may include a host 610 and a target virtual sub-machine 620.

The host 610 is configured to receive, by using a specified network interface of an SR-IOV network adapter, an IP packet sent by a communication peer terminal, a target MAC address and a target IP address in the IP packet respectively being a MAC address of a specified network interface of the host 610 and an IP address of the target virtual sub-machine 620.

In a specific implementation, the virtual machine data flow management system in this embodiment of the present disclosure is based on L2 (Layer 2, that is, a data link layer) exchange logic in a network adapter supporting a single-root I/O virtualization (SR-IOV) technology. A communication architecture of the network adapter of the SR-IOV technology may be shown in FIG. 3. A VF may be generated and allocated for the target virtual sub-machine 620 by using a PF of a network adapter of the host 610 in FIG. 3, an IP address and a virtual MAC address of the VF are allocated at the same time, and the VF obtained after the allocation is directly connected to the target virtual sub-machine. The specified network interface of the host 610 is a PF to which the VF of the target virtual sub-machine 620 in this embodiment belongs or is another VF belonging to a same PF to which the VF of the target virtual sub-machine 620 belongs. In this embodiment of the present disclosure, when the communication peer terminal sends an IP packet to the target virtual sub-machine 620 belonging to the same SR-IOV network adapter, a target MAC address in the IP packet is the MAC address of the specified network interface of the host 610 corresponding to the target virtual sub-machine 620, so that the host 610 may receive, by using a specified network interface of the SR-IOV network adapter, the IP packet sent by the communication peer terminal. The communication peer terminal is an external network device, that is, another network device besides the host 610.

The host is further configured to forward, according to the target IP address, the IP packet to a virtual connection function of the target virtual sub-machine in the same SR-IOV network adapter.

The host in this embodiment of the present disclosure may manage mapping relationships between VFs of virtual sub-machines and IP addresses of the VFs. When receiving an IP packet sent from outside, the host may forward, according to a target IP address included in the IP packet, the IP packet to a virtual connection function of a corresponding target virtual sub-machine in a same SR-IOV network adapter, so that the target virtual sub-machine receives the IP packet.

Therefore, after the host receives, by using the specified network interface, IP data sent by the communication peer terminal, packet filtering and QoS management may be performed on the IP data, and then network data obtained after the packet filtering and the QoS management is forwarded to the VF of the target virtual sub-machine, thereby implementing that on a side of the host, packet filtering and QoS management may be performed on network data sent to the target virtual sub-machine.

Further, in an optional embodiment, when the communication peer terminal sends the IP packet to the target virtual sub-machine 620, to set the target MAC address to the MAC address of the specified network interface of the host 610 corresponding to the target virtual sub-machine 620. In the present disclosure, the virtual machine data flow management system may further include: a virtual machine communication configuration module 630, configured to obtain an ARP request message that is sent by the communication peer terminal for the target virtual sub-machine 620, where a target IP address in the ARP request message is the IP address of the target virtual sub-machine 620; and send an ARP response message to the communication peer terminal according to the ARP request message, where a MAC address of a sender or an Ethernet source address in the ARP response message is the MAC address the specified network interface of the host 610, so that the communication peer terminal sends, according to the ARP response message, the IP packet to the specified network interface of the host 610 corresponding to the target virtual sub-machine 620.

In a specific implementation, the virtual machine communication configuration module 630 may be implemented in the target virtual sub-machine 620, or may be implemented in the host 610. If the virtual machine communication configuration module 630 is implemented in the target virtual sub-machine 620, when the target virtual sub-machine 620 receives the ARP request message that is for the target virtual sub-machine, the virtual machine communication configuration module 630 receives the ARP request message that is for the target virtual sub-machine. If the virtual machine communication configuration module 630 is implemented in the host 610 corresponding to the target virtual sub-machine 620, because the ARP request message is broadcast, the host-side also receives the ARP request message actually. However, generally, the host-side 610 discards the ARP request message because the target IP address in the ARP request message is not an IP address of the host-side. The virtual machine communication configuration module 630 in the host 610 may detect whether the target IP address in the ARP request message received by a physical network adapter from outside is the IP address of the target virtual sub-machine 620, and if yes, it is determined that the ARP request message sent by the communication peer terminal for the target virtual sub-machine 620 is obtained.

In the existing technology, when receiving the ARP request message, the target virtual sub-machine 620 sends a corresponding ARP response message to the communication peer terminal. In the ARP response message, an IP address (such as arp_spa in the ARP response message, a sender protocol address) of a sender is an IP address of a VF pre-allocated to the target virtual sub-machine 620, and a MAC address (such as a arp_sha field in the ARP response message, a sender hardware address) of the sender or an Ethernet source address (such as a ether_shost field in the ARP response message) is a virtual MAC address of the VF pre-allocated to the target virtual sub-machine 620. In this way, the communication peer terminal sends the IP packet to the target virtual sub-machine 620 according to the IP address of the sender and the MAC address of the sender (or the Ethernet source address) in the ARP response message. Because the VF in this architecture is directly connected to the target virtual sub-machine 620, a problem that on the host-side 610, management such as packet filtering and quality of service (QoS) cannot be performed on the IP packet sent to the virtual sub-machine may be generated.

Therefore, in this embodiment of the present disclosure, the virtual machine communication configuration module 630 sends an ARP response message to the communication peer terminal, where a MAC address of a sender or an Ethernet source address in the ARP response message is the MAC address of the specified network interface of the host 610 corresponding to the target virtual sub-machine 620, that is, a MAC address corresponding to a VF of the target virtual sub-machine 620 in the ARP response message that should be used to respond is replaced with the MAC address of the specified network interface of the host 610, so that after receiving the ARP response message, the communication peer terminal may send, according to the ARP response message, the IP packet to the specified network interface of the host 610 corresponding to the target virtual sub-machine 620. Subsequently, after the host 610 corresponding to the target virtual sub-machine 620 receives, by using the specified network interface, IP data sent by the communication peer terminal, packet filtering and QoS management are performed on the IP data, and then network data obtained after the packet filtering and the QoS management is forwarded to the VF of the target virtual sub-machine 620, thereby implementing that on the host-side 610, packet filtering and QoS management may be performed on network data sent to the target virtual sub-machine 620.

It should be noted that, the foregoing virtual machine communication configuration module 630 uses an APR response manner to enable the communication peer terminal to send the IP packet of the target virtual sub-machine to the specified network interface of the corresponding host is merely an optional embodiment of the present disclosure. In another optional embodiment, another manner may also be used, for example, on a side of the communication peer terminal, by manually configuring the target MAC address of the IP packet to the specified network interface of the host, or by broadcasting, in a network, a mapping relationship between an IP address of a virtual sub-machine and a MAC address of a specified network interface of a host corresponding to the virtual sub-machine, the communication peer terminal knows the MAC address of the specified network interface of the host corresponding to the target virtual sub-machine, so as to implement this objective.

Further, in this embodiment of the present disclosure, because transferring, by the specified network interface of the host, the IP packet of the virtual sub-machine is implemented by configuring the MAC address without any processing performed by a back-end driver on the host-side, so that generation of a performance bottleneck of a CPU on the host-side or an impact on a service life of the CPU are avoided, thereby fully implementing using a processing capability of a network adapter.

In another embodiment of the present disclosure, a virtual machine data flow management system may also include the host 610 and the target virtual sub-machine 620 shown in FIG. 6.

The target virtual sub-machine 620 is configured to send an IP packet by using a virtual connection function of an SR-IOV network adapter, a target MAC address and a target IP address in the IP packet respectively being a MAC address of a specified network interface of the host 610 corresponding to the target virtual sub-machine 620 in the same SR-IOV network adapter and an IP address of a communication peer terminal.

In a specific implementation, the virtual machine data flow management system in this embodiment of the present disclosure is based on L2 (Layer 2, that is, a data link layer) exchange logic in a network adapter supporting a single-root I/O virtualization (SR-IOV) technology. A communication architecture of the network adapter of the SR-IOV technology may be shown in FIG. 3. A VF may be generated and allocated for the target virtual sub-machine 620 by using a PF of a network adapter of the host 610 in FIG. 3, an IP address and a virtual MAC address of the VF are allocated at the same time, and the VF obtained after the allocation is directly connected to the target virtual sub-machine 620. The specified network interface of the host 610 is a PF to which the VF of the target virtual sub-machine 620 in this embodiment belongs or is another VF belonging to a same PF to which the VF of the target virtual sub-machine 620 belongs. When the target virtual sub-machine 620 sends the IP packet, the target IP address of the IP packet is an IP address of a target communication peer terminal, and the target MAC address is the MAC address of the specified network interface of the host 610 corresponding to the target virtual sub-machine 620 in the same SR-IOV network adapter, so that a side of the host 610 may receive, by using a specified network interface of the SR-IOV network adapter, the IP packet sent by the target virtual sub-machine 620.

The host 610 is configured to: after the IP packet is received by using the specified network interface in the SR-IOV network adapter, forward the IP packet to the communication peer terminal according to the target IP address.

Therefore, after the host 610 receives, by using the specified network interface, IP data sent by the target virtual sub-machine 620 by using the VF, packet filtering and QoS management may be performed on the IP data, and then network data obtained after the packet filtering and the QoS management is forwarded to the communication peer terminal, so as to implement that on the host-side 610, packet filtering and QoS management may be performed on network data sent by the target virtual sub-machine 620.

Further, in an optional embodiment, when the target virtual sub-machine 620 sends the IP packet, to set the target MAC address to the MAC address of the specified network interface of the host 610 corresponding to the virtual sub-machine. In the present disclosure, the virtual machine data flow management system may further include: a virtual machine communication configuration module 630, configured to: when it is detected that the target virtual sub-machine sends an ARP request message, send an ARP response message to the target virtual sub-machine 620 according to the ARP request message, where a MAC address of a sender or an Ethernet source address in the ARP response message is the MAC address the specified network interface of the host 610 corresponding to the target virtual sub-machine 620, so that the target virtual sub-machine 620 sends, according to the ARP response message, the IP packet to the specified network interface of the host 610 corresponding to the target virtual sub-machine 620.

Specifically, in this embodiment, the target virtual sub-machine 620 is pre-allocated an IP and a virtual MAC address of a VF, and the target virtual sub-machine 620 sends network data by using the VF. When the target virtual sub-machine 620 sends the ARP request message, an IP address (such as arp_spa in the ARP request message, a sender protocol address) of a sender and a MAC address (such as arp_sha in the ARP request message, a sender hardware address) of the sender of the ARP request message is the IP address and the virtual MAC address of the VF pre-allocated to the target virtual sub-machine 620, and a target IP address (such as arp_tpa in the ARP request message, a target protocol address) is the IP address of the target communication peer terminal. The virtual machine communication configuration module 630 may determine, according to the IP address of the sender and/or the MAC address of the sender in the ARP request message, that the ARP request message is sent by the target virtual sub-machine 620.

The virtual machine communication configuration module 630 may be implemented in the target virtual sub-machine 620, or may be implemented in the host 610. If the virtual machine communication configuration module 630 is implemented in the target virtual sub-machine 620, when the target virtual sub-machine 620 needs to send the ARP request message, the virtual machine communication configuration module 630 may know that, the virtual machine communication configuration module 630 may discard the ARP request message, that is, the virtual machine communication configuration module 630 intercepts and prevents the target virtual sub-machine from sending the ARP request message; and if the virtual machine communication configuration module 630 is implemented in the host 610 corresponding to the target virtual sub-machine 620, because the ARP request message is broadcast, actually, the host-side 610 receives the ARP request message first. However, generally, the host-side 610 discards the ARP request message because the target IP address in the ARP request message is not an IP address of the host-side 610. The virtual machine communication configuration module 630 on the host-side 610 may detect whether the IP address of the sender and/or the MAC address of the sender in the received ARP request message is the IP address and/or the MAC address of the target virtual sub-machine 620, and if yes, it is determined that the ARP request message sent by the target virtual sub-machine 620 is obtained.

Specifically, in the existing technology, after sending the ARP request message, the target virtual sub-machine 620 receives an ARP response message, where a MAC address of a sender or an Ethernet source address included in the ARP response message is the MAC address of the communication peer terminal. Then IP data is sent to the communication peer terminal according to the MAC address of the communication peer terminal. Because a VF in the communication architecture of the network adapter of the SR-IOV technology is directly connected to a Vport of a physical network adapter, that is, the IP data sent by the target virtual sub-machine 620 by using the VF may be sent directly by using the Vport. Therefore, a problem that on the host-side 610, management such as packet filtering and quality of service (QoS) cannot be performed on the IP packet sent by the virtual sub-machine 620 may be generated.

Therefore, in this embodiment of the present disclosure, the virtual machine communication configuration module 630 sends an ARP response message to the target virtual sub-machine 620, where a MAC address of a sender or an Ethernet source address in the ARP response message is the MAC address of the specified network interface of the host 610 corresponding to the target virtual sub-machine 620, that is, an ARP response message is forged, where an actual MAC address of the communication peer terminal corresponding to a target IP address in the ARP response message originally sent by the target virtual sub-machine 620 is replaced with the MAC address of the specified network interface of the host 610, so that after receiving the ARP response message, the target virtual sub-machine 620 may send, according to the ARP response message, the IP packet to the specified network interface of the host 610 corresponding to the target virtual sub-machine 620. Therefore, after the host 610 corresponding to the target virtual sub-machine 620 receives, by using the specified network interface, IP data subsequently sent by the target virtual sub-machine 620, packet filtering and QoS management are performed on the IP data, and then network data obtained after the packet filtering and the QoS management is sent to the communication peer terminal, thereby implementing that on the host-side 610, packet filtering and QoS management may be performed on network data sent by the target virtual sub-machine 620.

It should be noted that using an APR response manner to enable the target virtual sub-machine 620 to send the IP packet to the specified network interface of the corresponding host 610 is merely an optional embodiment of the present disclosure. In another optional embodiment, another manner may also be used, for example, the target virtual sub-machine 620 configures, in driver configuration, the target MAC address of the IP packet to the specified network interface of the corresponding host 610, so as to implement this objective.

Further, in this embodiment of the present disclosure, because transferring, by the specified network interface of the host 610, the IP packet of the virtual sub-machine is implemented by configuring the MAC address without any processing performed by a back-end driver on the host-side 610, so that generation of a performance bottleneck of a CPU on the host-side 610 or an impact on a service life of the CPU are avoided, thereby fully implementing using a processing capability of a network adapter.

Figure 7:
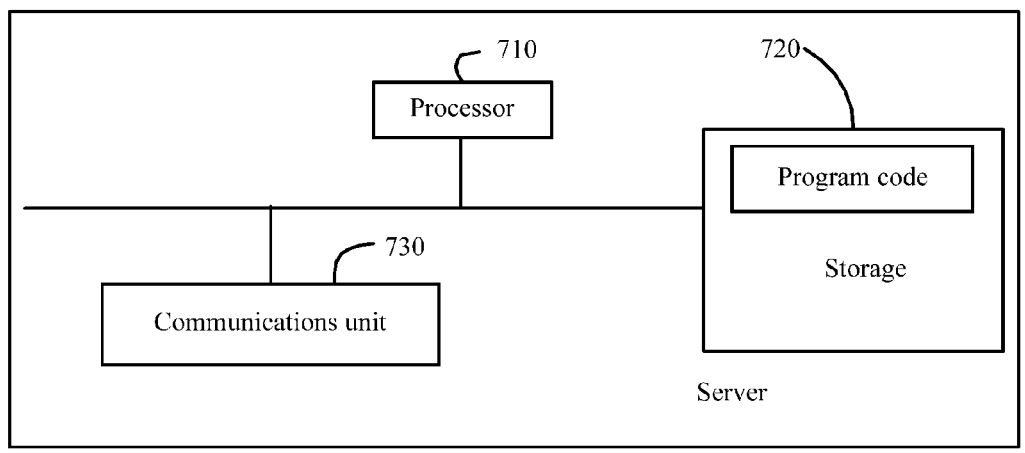
FIG. 7 is a schematic structural diagram of a server according to an embodiment of the present disclosure.

Referring to FIG. 7, an embodiment of the present disclosure also provides a server, which may include a component such as a processor 710, a storage 720, and a communications unit 730. These components communicate with each other by using one or more buses. A person skilled in the art may understand that a structure of the server shown in FIG. 7 does not constitute a limitation to the present disclosure, and the structure may be a bus structure or a star structure, and may also include more or fewer components than those shown in FIG. 7, or some components may be combined, or a different component deployment may be used.

The processor 710 is a control center of the server. Various parts of the entire server are connected by using various interfaces and lines. Various functions and/or data processing of the server are performed by running or executing computer program instruction and/or a module stored in the storage 720 and invoking data stored in the storage 720.

The storage 720 may be configured to store computer program instruction and a module. By running the computer program instruction and the module stored in the storage 720, the processor 710 performs various functional applications of the server and implements data processing. The storage 720 mainly includes a program storage area and a data storage area. The program storage area may store an operating system, and computer program instruction required by at least one function, such as computer program instruction for service processing. The data storage area may store data created according to use of the server.

The communications unit 730 is configured to establish a communication channel. The server is connected to a communication peer terminal by using the communication channel.

In the server shown in FIG. 7, the processor 710 may invoke the computer program instruction stored in the storage 720 to perform the following operations: receiving, by using a specified network interface of an SR-IOV network adapter, an IP packet sent by a communication peer terminal, a target MAC address and a target IP address in the IP packet respectively being a MAC address of a specified network interface of a host and an IP address of a target virtual sub-machine; and forwarding, according to the target IP address, the IP packet to a virtual connection function of the target virtual sub-machine in the same SR-IOV network adapter.

Before the receiving, by using a specified network interface, an IP packet sent by a communication peer terminal, the processor 710 may invoke the computer program instruction stored in the storage 720 to perform the following operations: obtaining an ARP request message that is sent by the communication peer terminal for the target virtual sub-machine, where a target IP address in the ARP request message is the IP address of the target virtual sub-machine; and sending an ARP response message to the communication peer terminal according to the ARP request message, where a MAC address of a sender or an Ethernet source address in the ARP response message is the MAC address of the specified network interface of the host, so that the communication peer terminal sends, according to the ARP response message, the IP packet to the specified network interface of the host corresponding to the target virtual sub-machine.

The specified network interface of the host is a physical connection function to which the virtual connection function of the target virtual sub-machine belongs, or is another virtual connection function belonging to a same physical connection function to which the virtual connection function of the target virtual sub-machine belongs.

In another embodiment of the present disclosure, the processor 710 may invoke the computer program instruction stored in the storage 720 to perform the following operations: sending an IP packet by using a virtual connection function of an SR-IOV network adapter, a target MAC address and a target IP address in the IP packet respectively being a MAC address of a specified network interface of a host corresponding to a target virtual sub-machine in the same SR-IOV network adapter and an IP address of a communication peer terminal; and forwarding the IP packet to the communication peer terminal according to the target IP address after receiving the IP packet by using the specified network interface in the SR-IOV network adapter.

Before the sending an IP packet, the processor 710 may invoke the computer program instruction stored in the storage 720 to perform the following operations: sending an ARP request message; and sending an ARP response message to the target virtual sub-machine according to the ARP request message, where a MAC address of a sender or an Ethernet source address in the ARP response message is the MAC address of the specified network interface of the host, so that the target virtual sub-machine sends, according to the ARP response message, the IP packet to the specified network interface of the host.

After it is detected that the ARP request message is sent, the processor 710 may invoke the computer program instruction stored in the storage 720 to perform the following operations: discarding the ARP request message.

The specified network interface of the host corresponding to the target virtual sub-machine is a physical connection function to which a virtual connection function of the target virtual sub-machine belongs, or is another virtual connection function belonging to a same physical connection function to which the virtual connection function of the target virtual sub-machine belongs.

In this embodiment of the present disclosure, by configuring a MAC address of a specified network interface of a host corresponding to a virtual sub-machine in an IP packet passing through the virtual sub-machine, network data of a target virtual sub-machine may pass through the specified network interface of the host, so that packet filtering and QoS management on the network data of the target virtual sub-machine may be implemented. In addition, because data is not processed by using a back-end driver on a side of the host, generation of a performance bottleneck of a CPU on the host-side or an impact on a service life of the CPU are avoided, thereby fully implementing using a processing capability of a network adapter.

A person of ordinary skill in the art may understand that all or some of the procedures of the methods in the embodiments may be implemented by a computer program instructing relevant hardware. The program may be stored in a computer readable storage medium. When the program runs, the procedures of the methods in the embodiments are performed. The storage medium may include: a magnetic disk, an optical disc, a read-only memory (ROM), or a random access memory (RAM).

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A virtual machine data flow management method, comprising:
   receiving, by a host, by using a specified network interface of a single-root I/O virtualization (SR-IOV) network adapter, an Internet Protocol (IP) packet sent by a communication peer terminal, a target Media Access Control (MAC) address and a target IP address in the IP packet respectively being a MAC address of a specified network interface of the host and an IP address of a target virtual sub-machine; and
   forwarding, by the host, according to the target IP address, the IP packet to a virtual connection function of the target virtual sub-machine in the SR-IOV network adapter, wherein the specified network interface of the host is a physical connection function to which the virtual connection function of the target virtual sub-machine belongs, or is another virtual connection function belonging to a same physical connection function to which the virtual connection function of the target virtual sub-machine belongs.

2. The virtual machine data flow management method according to claim 1, further comprising:
   obtaining a request message that is sent by the communication peer terminal for the target virtual sub-machine, wherein a target IP address in the request message is the IP address of the target virtual sub-machine; and
   sending a response message to the communication peer terminal according to the request message, wherein a MAC address of a sender or an Ethernet source address in the response message is the MAC address of the specified network interface of the host, so that the communication peer terminal sends, according to the response message, the IP packet to the specified network interface of the host corresponding to the target virtual sub-machine.

3. A virtual machine data flow management method, comprising:
   sending, by a target virtual sub-machine, an IP packet by using a virtual connection function of a single-root I/O virtualization (SR-IOV) network adapter, a target Media Access Control (MAC) address and a target Internet Protocol (IP) address in the IP packet respectively being a MAC address of a specified network interface of a host corresponding to the target virtual sub-machine in the same SR-IOV network adapter and an IP address of a communication peer terminal; and
   forwarding, by the host, the IP packet to the communication peer terminal according to the target IP address after receiving the IP packet by using the specified network interface in the SR-IOV network adapter, wherein the specified network interface of the host corresponding to the target virtual sub-machine is a physical connection function to which a virtual connection function of the target virtual sub-machine belongs, or is another virtual connection function belonging to a same physical connection function to which the virtual connection function of the target virtual sub-machine belongs.

4. The virtual machine data flow management method according to claim 3, before the sending, by a target virtual sub-machine, an IP packet, further comprising:
   sending, by the target virtual sub-machine, a request message; and
   sending a response message to the target virtual sub-machine according to the request message, wherein a MAC address of a sender or an Ethernet source address in the response message is the MAC address of the specified network interface of the host, so that the target virtual sub-machine sends, according to the response message, the IP packet to the specified network interface of the host.

5. The virtual machine data flow management method according to claim 4, after it is detected that the target virtual sub-machine sends the request message, further comprising:
   discarding the request message.

6. A virtual machine data flow management system, comprising a host and a target virtual sub-machine,
   the target virtual sub-machine being configured to send an IP packet by using a virtual connection function of a single-root I/O virtualization (SR-IOV) network adapter, a target Media Access Control (MAC) address and a target Internet Protocol (IP) address in the IP packet respectively being a MAC address of a specified network interface of the host corresponding to the target virtual sub-machine in the same SR-IOV network adapter and an IP address of a communication peer terminal; and
   the host being configured to: after the IP packet is received by using the specified network interface in the SR-IOV network adapter, forward the IP packet to the communication peer terminal according to the target IP address.

7. The virtual machine data flow management system according to claim 6, further comprising:
   a virtual machine communication configuration module, configured to: when it is detected that the target virtual sub-machine sends a request message, send a response message to the target virtual sub-machine according to the request message, wherein a MAC address of a sender or an Ethernet source address in the response message is the MAC address the specified network interface of the host, so that the target virtual sub-machine sends, according to the response message, the IP packet to the specified network interface of the host corresponding to the target virtual sub-machine.

8. The virtual machine data flow management system according to claim 7, wherein the virtual machine communication configuration module is further configured to:
   discard the request message after it is detected that the target virtual sub-machine sends the request message.

9. A server, comprising:
   a memory, configured to store computer program instruction; and
   a processor, configured to invoke the computer program instruction to perform the following operations:
   receiving, by using a specified network interface of a single-root I/O virtualization (SR-IOV) network adapter, an Internet Protocol (IP) packet sent by a communication peer terminal, a target Media Access Control (MAC) address and a target IP address in the IP packet respectively being a MAC address of a specified network interface of a host and an IP address of a target virtual sub-machine; and
   forwarding, according to the target IP address, the IP packet to a virtual connection function of the target virtual sub-machine in the same SR-IOV network adapter, wherein the specified network interface of the host is a physical connection function to which the virtual connection function of the target virtual sub-machine belongs, or is another virtual connection function belonging to a same physical connection function to which the virtual connection function of the target virtual sub-machine belongs.

10. The server according to claim 9, wherein before the receiving, by using a specified network interface, an IP packet sent by a communication peer terminal, the processor is configured to invoke the computer program instruction to perform the following operations:
    obtaining a request message that is sent by the communication peer terminal for the target virtual sub-machine, wherein a target IP address in the request message is the IP address of the target virtual sub-machine; and
    sending a response message to the communication peer terminal according to the request message, wherein a MAC address of a sender or an Ethernet source address in the response message is the MAC address of the specified network interface of the host, so that the communication peer terminal sends, according to the response message, the IP packet to the specified network interface of the host corresponding to the target virtual sub-machine.

* * * * *